United States Patent [19]

Box

[11] Patent Number: 4,971,202

[45] Date of Patent: Nov. 20, 1990

[54] STACKABLE RECYCLING CRATE

[75] Inventor: Thomas Box, Shrewsbury, N.J.

[73] Assignee: Spectrum International, Inc., Tinton Falls, N.J.

[21] Appl. No.: 381,079

[22] Filed: Jul. 18, 1989

[51] Int. Cl.⁵ .......................... B65D 21/04; B65D 1/44
[52] U.S. Cl. .................................... 206/511; 206/429; 206/507
[58] Field of Search ............... 206/507, 429, 511, 505, 206/509, 512, 503

[56] References Cited

U.S. PATENT DOCUMENTS

| | | |
|---|---|---|
| 242,600 | 12/1976 | Box . |
| 266,709 | 10/1982 | Box . |
| 3,361,293 | 1/1968 | Box . |
| 3,392,875 | 7/1968 | Bockenstette . |
| 3,568,879 | 3/1971 | Box . |
| 3,628,684 | 12/1971 | Sere . |
| 3,644,088 | 4/1972 | Box . |
| 3,659,743 | 5/1972 | Box . |
| 3,840,115 | 10/1974 | Ladewig . |
| 3,997,055 | 12/1976 | Box . |
| 3,998,327 | 12/1976 | Box . |
| 3,998,328 | 12/1976 | Box . |
| 4,161,252 | 7/1979 | Howells . |
| 4,441,615 | 4/1984 | Goodrich . |
| 4,457,433 | 7/1984 | Wilson ................................. 206/507 |
| 4,478,156 | 10/1984 | Anderson ........................... 206/511 |
| 4,520,928 | 6/1985 | Wilson ................................. 206/507 |
| 4,548,320 | 10/1985 | Box . |
| 4,739,894 | 4/1988 | Pender . |
| 4,775,050 | 10/1988 | Box . |
| 4,819,822 | 4/1989 | Box . |

Primary Examiner—Joseph Man-fu Moy
Attorney, Agent, or Firm—Hedman, Gibson, Costigan & Hoare

[57] ABSTRACT

A stackable crate and stackable crate system, wherein each crate comprises: a pair of opposing sidewalls, a back wall coupled to the sidewalls, and a front wall coupled to the sidewalls. The front wall has a first substantially rectangularly shaped opening at the top portion and a second substantially rectangularly shaped opening at the bottom portion of the front wall, thereby defining in the front wall a central portion with the bottom edge of the central portion extending to form at each end a lower leg segment and the top edge of the central portion extending to form at each end an upper leg segment. A bottom side is planar as it extends away from the back wall but tapers upwardly to merge with the central portion. The bottom side is joined to the sidewalls and to the back wall to define a storage compartment in the interior of the crate.

16 Claims, 5 Drawing Sheets

STACKABLE RECYCLING CRATE

BACKGROUND OF THE INVENTION

This invention relates to stackable crates for refuse. More particularly, this invention relates to a stackable crate and a stackable crate system for receiving different types of refuse for recycling purposes.

Refuse collection and removal have become a significant problem in many communities such that various solutions have been sought to reduce the amount of refuse that requires removal, for example, to a garbage dump, land fill site and/or incineration plant. In some cases, municipal regulations require a home owner or business establishment to separate refuse into different types, for example, to separate glass bottles, aluminum cans, plastic containers, newspapers and the like from each other not only for recycling purposes but also to reduce the amount of residual refuse which requires removal to a garbage dump, land fill or incineration plant.

Because of the requirement to separate refuse into different types, home owners and business establishments have usually resorted to setting aside separate containers for each type of refuse. For example, one container may be set aside for aluminum cans, a second container for plastic materials, a third container for newspapers and paper and a fourth container for any remaining refuse. When the containers are placed side by side, however, a rather large space is required and this is not generally convenient to home owners and businesses. When such containers are stacked, insertion of refuse into the lower crates is difficult.

Prior art refuse containers have attempted to strike a balance between the demands of space and accessibility. For example, Pender, U.S. Pat. No. 4,739,894 discloses a container assembly formed of four semi-cylinders with an upper pair of containers stacked on a lower pair of containers. The upper containers have recessed walls which mate to provide chutes to the lower containers for the segregation of different types of refuse. Also, Howells, U.S. Pat. No. 4,161,252 discloses a set of sorting-stacking bins having tapered containers, each having upstanding, inclined walls and an integral horizontal bottom. These prior art containers are deficient in that when stacked, it is difficult to insert large plastic bottles or newspapers through the container opening into the appropriate container. Moreover, newspaper and other paper materials fail to lie flat in these prior art containers because the containers do not have a box-shaped frame. Thus, such newspapers are difficult to bundle quickly.

Square and rectangular plastic injection molded crates have long been used for storage and transporting milk cartons. Illustrations of milk carton crates are seen in U.S. Pat. Nos. 3,840,115 and 4,819,822.

A rectangular prior art crate exists wherein the front wall of the crate has a rectangularly shaped opening at the top portion. There is, however, no opening at the bottom portion of the front wall of this prior art crate. A disadvantage of this prior art crate is that when several of these crates are stacked vertically, it may be difficult to insert refuse, especially large bottles, through the front wall opening of crates below the uppermost crate. If the opening is enlarged, however, to accommodate large pieces of refuse, refuse may slip out through the front wall opening during transport of the crates to the disposal area. Further, large openings are inimical to the structural integrity of molded plastic crates.

SUMMARY OF THE INVENTION

Accordingly, it is an object of the invention to provide a stackable crate and stackable crate system of simple, sturdy, and compact construction wherein different types of refuse can be easily and rapidly inserted into the appropriate crate.

Also, an object of the invention is to be able to easily transport the separate crates from the storage area to the pick-up area.

Another object of the invention is to provide a stackable crate and stackable crate system wherein newspapers and other paper products lie flat for rapid bundling.

Other objects of the invention are to provide a simple stackable crate and stackable crate system which occupy a minimum of space, which provide a maximum amount of compartment space, and which can be readily used by a home owner.

Accordingly, the invention involves a stackable crate comprising:
 (a) a pair of opposing sidewalls;
 (b) a back wall coupled to the sidewalls;
 (c) a front wall coupled to the sidewalls and having a first substantially rectangularly shaped opening at the top portion of the front wall and a second substantially rectangularly shaped opening at the bottom portion of the front wall, thereby defining in the front wall a central portion with the bottom edge of the central portion extending to form at each end a lower leg segment and the top edge of the central portion extending to form at each end an upper leg segment; and
 (d) a bottom side being planar as the bottom side extends away from the back wall and tapering upwardly to merge with the central portion, wherein the bottom side is joined to the sidewalls and to the back wall to define a storage compartment in the interior of the crate.

This invention also is directed to a stackable crate system comprising a plurality of crates, wherein each crate is as defined above, supra, and the crates are stacked one on top of each other such that a large combined opening is formed by the bottom opening of the front wall of a higher crate and the top opening of the front wall of a lower crate.

BRIEF DESCRIPTION OF THE DRAWINGS

The invention will be understood when viewed with the drawings wherein.

DETAILED DESCRIPTION OF THE PREFERRED EMBODIMENT

Figure 1:
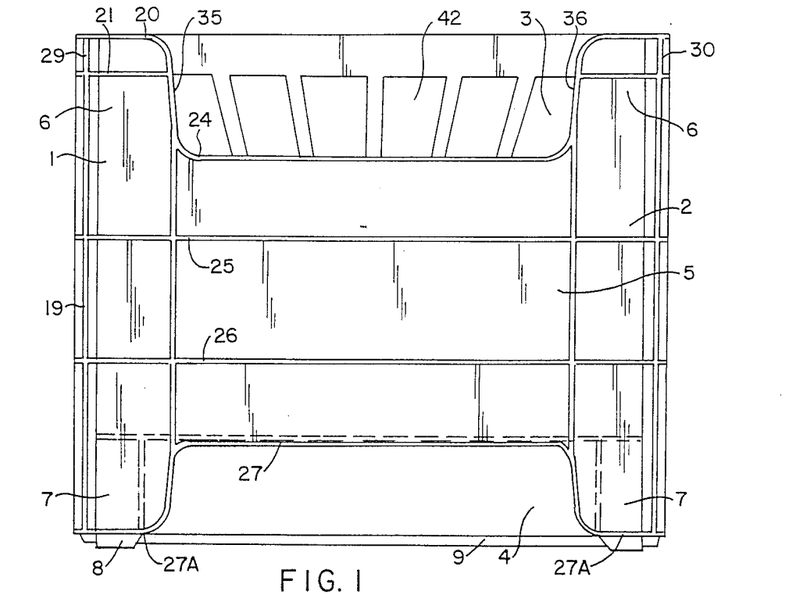
FIG. 1 illustrates a front view partially in section of the stackable crate.
Figure 2:
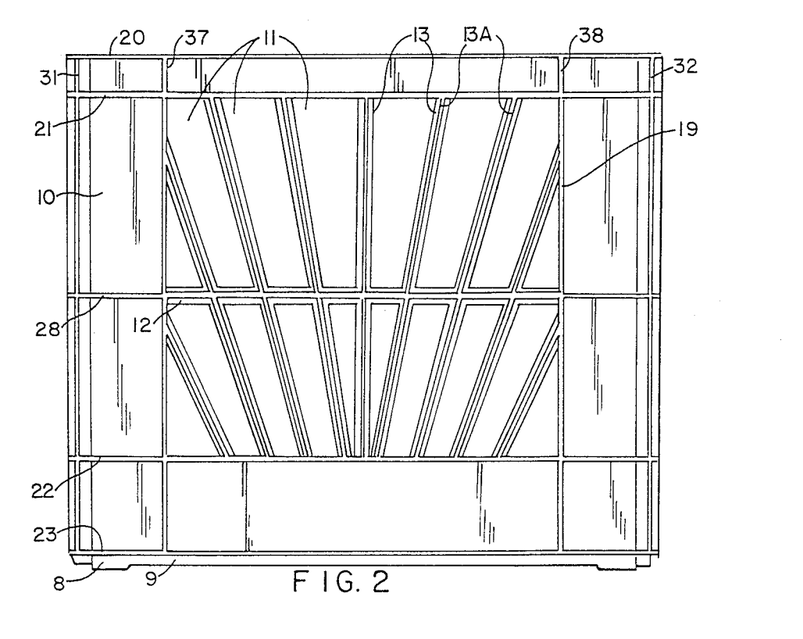
FIG. 2 illustrates a back view of the stackable crate.
Figure 3:
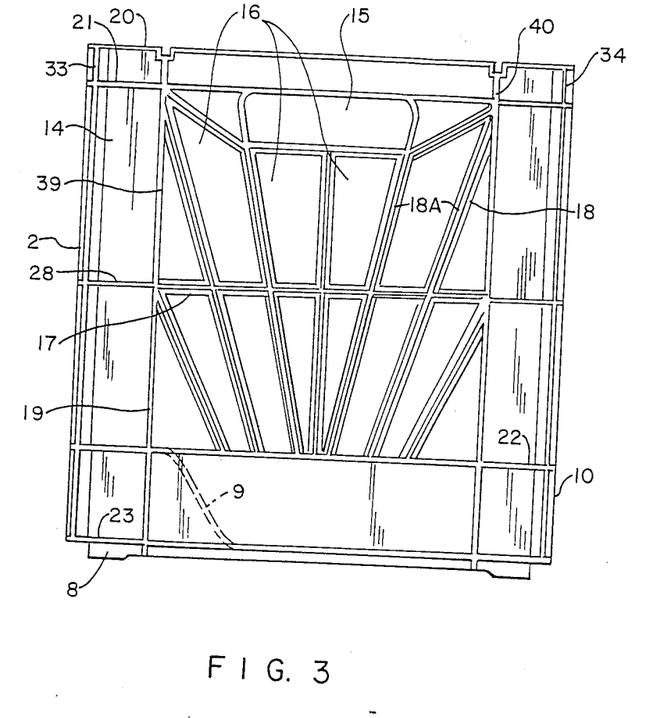
FIG. 3 illustrates a side view partially in section of the stackable crate.

The stackable crate 1 of the present invention has a box-like structure with four walls and a bottom. Referring to FIG. 1, the front wall 2 has a substantially rectangularly shaped top opening 3 and a substantially rectangularly shaped bottom opening 4 that define a central portion 5 between the openings and a pair of upper leg segments 6 and a pair of lower leg segments 7. It is preferred that the opening 3 at the top portion is larger than the opening 4 at the bottom portion. As seen in FIGS. 1-3, there is a raised groove 8 along the edges of the exterior surface of the bottom 9 to facilitate stacking of the crates.

Referring to FIG. 2, the back wall 10 of the stackable crate 1 has a plurality of air vents 11 spaced at regular intervals that define a central horizontal bar 12 and a series of brace elements 13 spread in a fan pattern.

Referring to FIG. 3, each side wall 14 has a hand-grip opening 15 located at the top central portion. Also, there are a plurality of air vents 16 spaced at regular intervals that define a central horizontal bar 17 and a series of brace elements 18 spread in a fan pattern. The air vents 11, 16 of the back wall 10 and side walls 14 can be of various dimensions. The bottom 9 (seen in outline) is planar as it extends away from the back wall 10 but tapers upwardly to merge with the central portion 5 of the front wall 2. Preferably, the bottom 9 merges with the bottom edge of the central portion 5 of the front wall 2. It is also preferred that the bottom 9 has no air vents to prevent leakage between stacked crates.

As seen in FIGS. 1-3, the crate 1 is provided with a rib structure 19 or girdle to afford the durability and strength required for refuse containers. The rib structure 19 is integrally formed with the various sides of the crate. The rib structure 19 is composed of two horizontal ribs 20, 21 at the top of the crate 1 that extend around the crate and two horizontal ribs 22, 23 at the bottom of the crate that extend around the side and back walls. As seen in FIG. 1, there are four horizontal ribs 24, 25, 26, 27 that run parallel across the central portion 5 of the front wall 2, two of which (24, 27) define the top and bottom edges of the central portion 5. A short horizontal rib 27A is disposed at the end of each lower leg segment 7. As seen in FIGS. 2-3, a horizontal rib 28 runs along the center of the back and side walls and is integrally disposed with the central bar 12, 17. In addition, there are vertical edge ribs 29, 30, 31, 32, 33, 34 located at the edges of the crate 1. Also, there are other vertical ribs 35, 36, 37, 38, 39, 40, two on each side, positioned at a distance away from the edges. Moreover, a series of ribs 13A, 13B are integrally disposed with the brace elements 13, 18 of the back and side walls.

Figure 4:
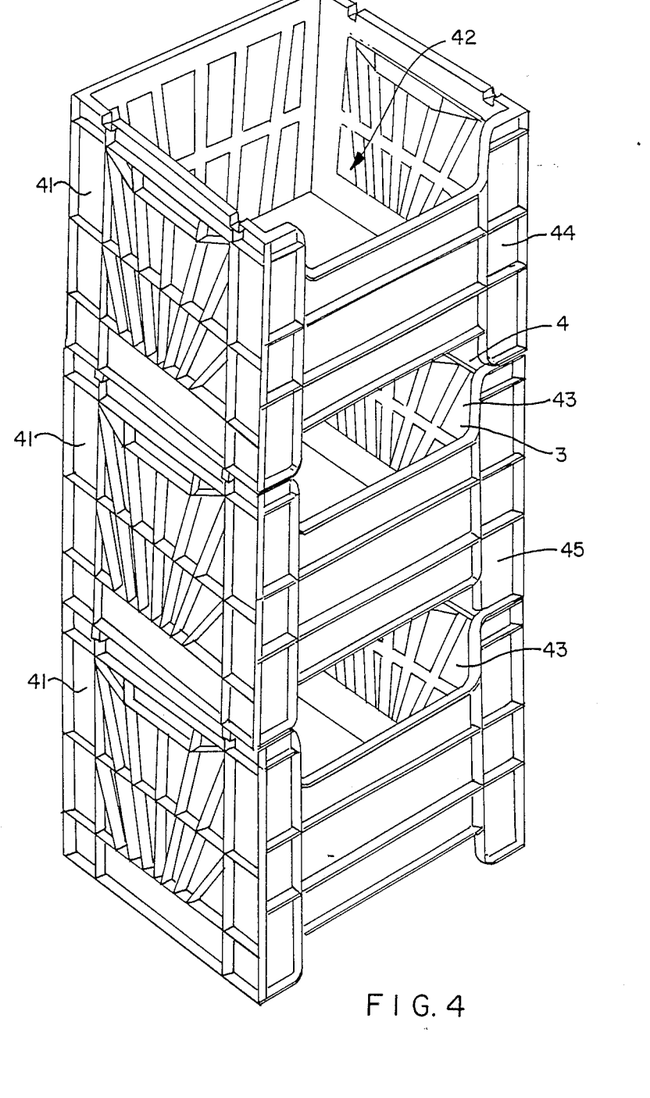
FIG. 4 illustrates a perspective view of the stackable crate system having three stacked crates.

Referring to FIG. 4, the crates can be stacked vertically to comprise a stackable recycling crate system 41. The raised groove 8 present along the edges of the exterior surface of the bottom 9 nests in the interior of a lower crate along the top inner edges (not shown). It is preferred that the crate system includes three crates, although a greater number of crates can be used. Within each crate, the four walls and the bottom are joined to define therein a storage compartment 42. When the crates are stacked vertically, the combined opening 43 is formed from the joining of the bottom opening 4 of the front wall of a higher crate 44 with the top opening 3 of the front wall of a lower crate 45.

Figure 5:
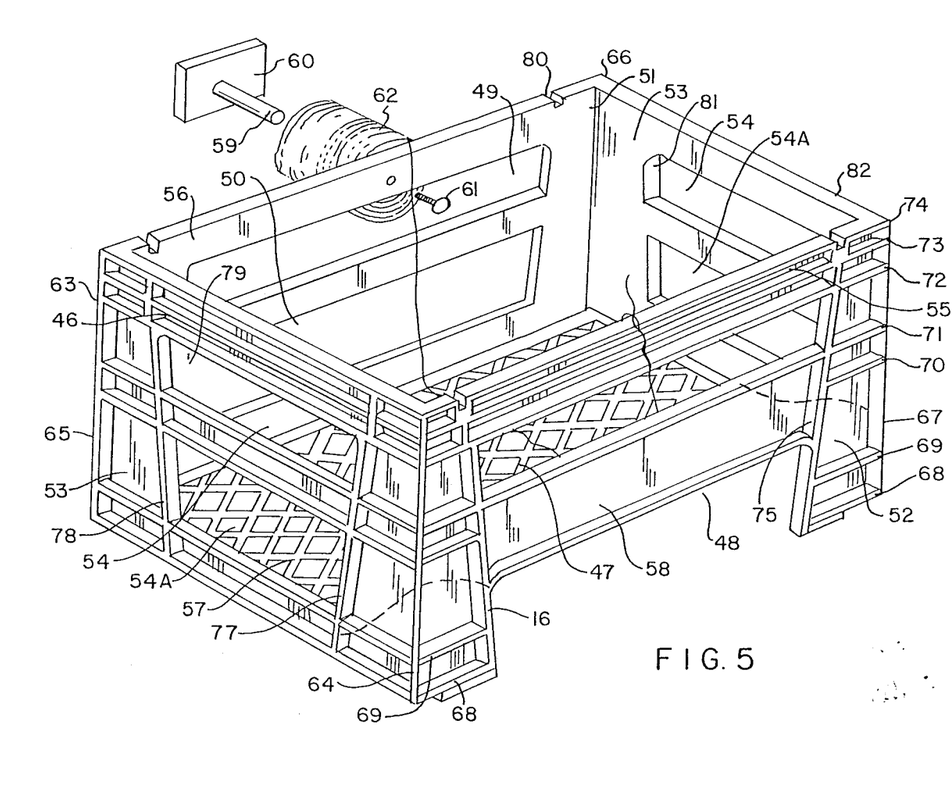
FIG. 5 illustrates a perspective view of the paper crate.

Referring to FIG. 5, there is shown a paper crate 46 with paper bundling means that can be used to tie paper products such as newspapers and magazines into bundles. The paper crate 46 has a box-shaped frame with substantially rectangularly shaped openings 47, 48, 49, 50 in the back wall 51 and front wall 52. It is preferred that the side walls 53 also have openings 54, 54A of any shape. Preferably, the opening 48 at the bottom portion of the front wall 52 is substantially rectangularly shaped. The openings 47, 49 present in the back and front walls, define a bar member 55, 56 on the top portion of both the back and front walls. The bottom 57 preferably has a plurality of air vents. The bottom 57 is planar as it extends away from the back wall 51 but tapers upwardly to merge with the bottom edge of the central portion 58 of the front wall 52. A dowel 59 having a threaded cavity on one end and a cap 60 at the other end is positioned on the exterior surface of the bar element 56 of the back wall 51. A removable screw 61 fixes the dowel 59 against the bar element 56. A roll of twine 62 is wrapped around the dowel 59 with a portion of twine from the roll lying across the bottom 57, the end of the portion of twine being tied to the bar element 55 of the front wall 52.

As seen in FIG. 5, the paper crate 46 is provided with a rib structure 63 or girdle. The rib structure is integrally formed with the front, back, and side walls of the paper crate. The rib structure 63 comprises four vertical ribs 64, 65, 66, 67 extending diagonally from each corner of the paper crate 46, horizontal lower ribs 68, 69, two horizontal intermediate ribs 70, 71 and three horizontal upper ribs 72, 73, 74; the horizontal ribs are continuously formed around the paper crate 46. In addition, eight ribs 75, 76, 77, 78, 79, 80, 81, 82 extend along the respective vertical edges of the openings in the longitudinal and lateral sides of the paper crate 46. The vertical ribs 77, 78, 79, 80, 81, 82 are formed along the edges of the respective openings 49-50, 54-54A in the same manner as vertical ribs 75, 76.

Figure 6:
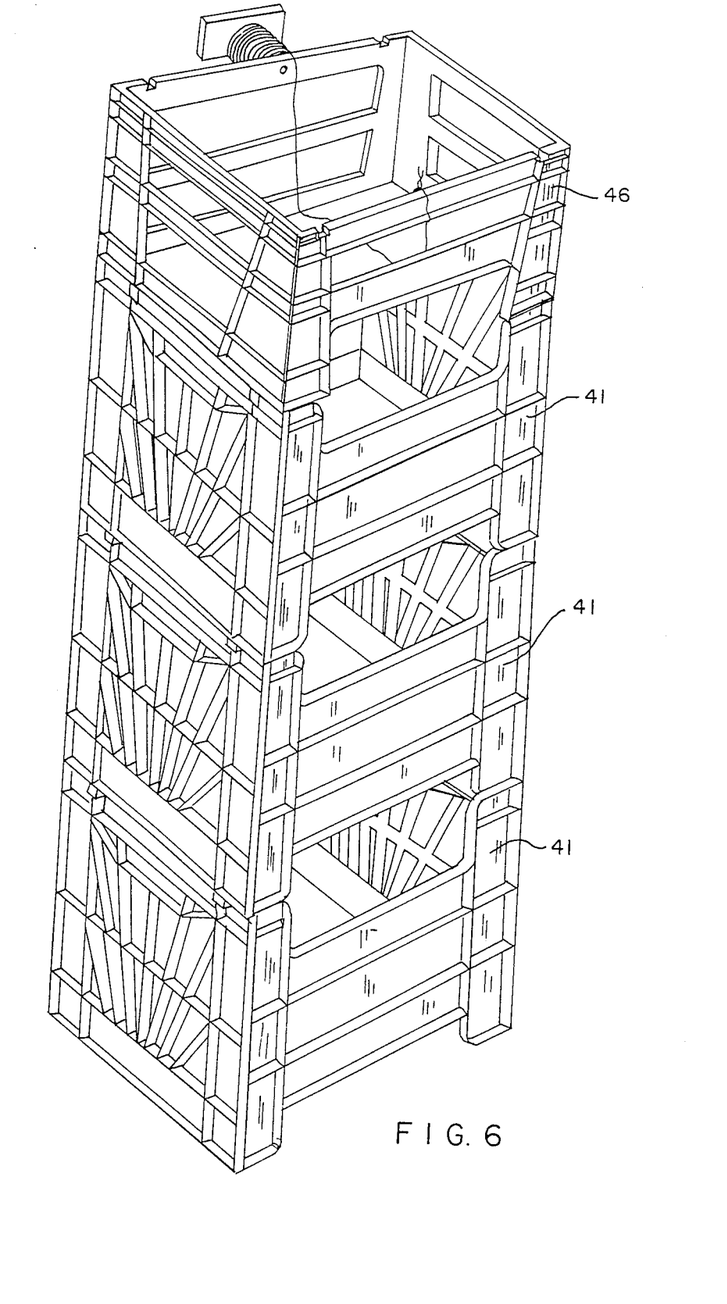
FIG. 6 illustrates a perspective view of the stackable crate system having four crates, the uppermost crate being the paper crate.

Referring to FIG. 6, the paper crate 46 is shown as part of the stackable crate system 41 with the paper crate 46 being the uppermost crate.

Each crate of the present invention including the paper crate is molded from plastic or may be formed in any other suitable manner.

The crate of the present invention can be sized to be of any suitable capacity. In particular, the individual crates as well as the openings in the front wall can be sized so as to readily handle large items, such as plastic bottles, without jamming occurring either in the front wall openings or within the storage compartments. Furthermore, the crates of the stackable crate system may be of different heights so as to provide different capacities from each other.

In use, an individual wishing to separate refuse would dedicate any of the crates of the stackable crate system to a specific type of refuse, for example, glass, aluminum cans, steel cans, plastics, and the like, depending upon the recycling program established in the particular community involved.

In view of the sizes of bottles and cans now commonly used, practice has taught that a crate having the following dimensions will have the best utility in the crate system of the invention: 17¼ in. (front and back wall length), 14¼ in. (side wall length), and 13⅜ in. (height). In a preferred embodiment, the central panel of the front wall is recessed approximately 3½ in. from the top and approximately 2⅝ in. from the bottom.

Whereas the preferred form and several variations of the invention have been shown and suggested, it should be understood that suitable additional modifications, changes, substitutions and alterations may be made without departing from the fundamental theme of the invention.

I claim:

1. A stackable crate comprising:
   (a) a pair of opposing sidewalls;
   (b) a back wall coupled to the sidewalls;
   (c) a front wall coupled to the sidewalls and having a first substantially rectangularly shaped opening at the top portion of the front wall and a second substantially rectangularly shaped opening at the bottom portion of the front wall, thereby defining in the front wall a central portion with the bottom edge of the central portion extending to form at each end a lower leg segment and the top edge of the central portion extending to form at each end an upper leg segment; and
   (d) a bottom side being planar as the bottom side extends away from the back wall and tapering upwardly to merge with the central portion, wherein the bottom side as joined to the sidewalls and to the back wall to define a storage compartment in the interior of the crate.

2. The stackable crate according to claim 1 wherein the bottom side merges with at least a substantial portion of the bottom edge of the central portion of the front wall.

3. The stackable crate according to claim 1 wherein the back wall has at least one air vent.

4. The stackable crate according to claim 1 wherein the back wall and the side walls have air vents.

5. The stackable crate according to claim 1 wherein the bottom portion has no air vents.

6. The stackable crate according to claim 1 further comprising coupling means extending from the exterior surface of the bottom side to facilitate stacking of the crate on top of a second crate.

7. The stackable crate according to claim 6 wherein the coupling means is a raised groove running along the edges of the exterior surface of the bottom side.

8. The stackable crate according to claim 1 wherein each side wall has a hand-grip hole.

9. The stackable crate according to claim 1 wherein the first opening is larger than the second opening.

10. The stackable crate according to claim 1 further comprising: a rib structure which is integrally formed with the front wall, the back wall, and the side walls.

11. A stackable crate comprising:
    (a) a pair of opposing sidewalls, each sidewall having a hand-grip hole and a plurality of air vents;
    (b) a back wall having a plurality of air vents and coupled to the sidewalls;
    (c) a front wall coupled to the sidewalls and having a first substantially rectangularly shaped opening at the top portion of the front wall and a smaller second substantially rectangularly shaped opening at the bottom portion of the front wall, thereby defining in the front wall a central portion with the bottom edge of the central portion extending to form at each end a lower leg segment and the top edge of the central portion extending to form at each end an upper leg segment;
    (d) a bottom side being planar as the bottom side extends away from the back wall and tapering upwards to merge with at least a substantial portion of the bottom edge of the central portion, wherein the bottom side is joined to the sidewalls and to the back wall to define a storage compartment in the interior of the crate;
    (e) coupling means extending from the exterior surface of the bottom side to facilitate stacking of the crate on top of a second crate; and
    (f) a rib structure which is integrally formed with the front wall, the back wall, and the side walls.

12. A stackable crate system comprising a plurality of crates wherein each crate is as defined according to claim 1 and the crates are stacked one on top of each other such that a large combined opening is formed by the second opening of the front wall of a higher crate and the first opening of the front wall of a lower crate.

13. The stackable crate system according to claim 12 wherein the system comprises three crates.

14. The stackable crate system according to claim 12 further comprising a paper crate wherein the paper crate comprising:
    (a) a pair of opposing sidewalls;
    (b) a back wall coupled to the sidewalls;
    (c) a front wall coupled to the sidewalls and having a substantially rectangularly shaped opening at the bottom portion of the front wall;
    (d) a bottom side being planar as the bottom side extends away from the back wall and tapering upwards to merge with the front wall, wherein the bottom side is joined to the sidewalls and to the back wall to define a storage compartment in the interior of the crate; and
    (e) paper tying means coupled to opposing walls of the paper crate.

15. The stackable crate system according to claim 14 wherein the paper tying means comprises:
    (a) a dowel having a threaded cavity on one end and a cap at the other end, positioned on the exterior surface of the back wall, wherein the end containing the threaded cavity is placed directly over a hole through the back wall;
    (b) a removable screw, inserted into the hole and threaded into the dowel; and
    (c) a roll of twine wrapped around the dowel with a portion of twine from the roll lying across the bottom side, the end of the portion of twine being fixed to the front wall.

16. The stackable crate system according to claim 14 wherein the paper crate further comprises a rib structure which is integrally formed with the front wall, the back wall, and the side walls.

* * * * *

REEXAMINATION CERTIFICATE (3204th)
United States Patent [19]

Box

[11] B1 4,971,202

[45] Certificate Issued May 27, 1997

[54] STACKABLE RECYCLING CRATE

[75] Inventor: Thomas Box, Shrewsbury, N.J.

[73] Assignee: Spectrum International, Inc., Tinton Falls, N.J.

Reexamination Request:
No. 90/003,301, Jan. 7, 1994

Reexamination Certificate for:
Patent No.: 4,971,202
Issued: Nov. 20, 1990
Appl. No.: 381,079
Filed: Jul. 18, 1989

[51] Int. Cl.[6] .................. B65D 21/04; B65D 1/42
[52] U.S. Cl. .................. 206/511; 206/429; 206/507
[58] Field of Search .................. 206/54, 429, 507

[56] References Cited

U.S. PATENT DOCUMENTS

| | | | |
|---|---|---|---|
| 2,554,232 | 5/1951 | Young, Jr. | 211/181 |
| 2,579,655 | 12/1951 | Donald | 220/6 |
| 2,652,174 | 9/1953 | Shea et al. | 222/185 |
| 2,735,568 | 2/1956 | Bitney | 220/6 |
| 2,898,122 | 8/1959 | Beckner | 280/12 |
| 2,916,293 | 12/1959 | Lang | 280/79.3 |
| 2,923,428 | 2/1960 | Averill | 220/19 |
| 3,136,443 | 6/1964 | Muckler | 220/19 |
| 3,240,351 | 3/1966 | Weiss et al. | 211/126 |
| 3,245,572 | 4/1966 | Mashy et al. | 220/19 |
| 3,627,163 | 12/1971 | Taylor et al. | 220/6 |
| 3,682,351 | 8/1972 | De Putter | 220/97 B |
| 3,704,791 | 12/1972 | Young, Jr. | 211/126 |
| 3,722,735 | 3/1973 | Herolzer | 220/97 E |
| 3,842,982 | 10/1974 | Joyce | 211/126 |
| 3,866,787 | 2/1975 | Allegri et al. | 220/19 |
| 4,015,713 | 4/1977 | Clipson et al. | 206/509 |
| 4,015,886 | 4/1977 | Wickenberg | 312/107 |
| 4,200,346 | 4/1980 | Belokin, Jr. | 312/351 |
| 4,316,540 | 2/1982 | Lapham | 206/507 |
| 4,372,444 | 2/1983 | Le Grand et al. | 206/505 |
| 4,700,842 | 10/1987 | Grusin | 206/508 |

FOREIGN PATENT DOCUMENTS

| | | | |
|---|---|---|---|
| 1215003 | 12/1986 | Canada | B65D 21/04 |
| 0042972 | 1/1982 | European Pat. Off. | B65D 21/02 |
| 0236514 | 9/1987 | European Pat. Off. | B65D 21/02 |
| 0265581 | 4/1988 | European Pat. Off. | B65D 21/04 |
| 3047914 | 7/1982 | Germany | B65G 57/30 |

OTHER PUBLICATIONS

Sterilite Stack N' Nest Bin, Sterilite Product Specification Sheet, 1985.
Sterilite Catalog, 1983, p. 15.
Sterilite Plastic Housewares Catalog For 1967–68, p. 3.
Tucker Housewares Product Catalog, 1986, pp. 30–35.

*Primary Examiner*—Joseph M. Moy

[57] ABSTRACT

A stackable crate and stackable crate system, wherein each crate comprises: a pair of opposing sidewalls, a back wall coupled to the sidewalls, and a front wall coupled to the sidewalls. The front wall has a first substantially rectangularly shaped opening at the top portion and a second substantially rectangularly shaped opening at the bottom portion of the front wall, thereby defining in the front wall a central portion with the bottom edge of the central portion extending to form at each end a lower leg segment and the top edge of the central portion extending to form at each end an upper leg segment. A bottom side is planar as it extends away from the back wall but tapers upwardly to merge with the central portion. The bottom side is joined to the sidewalls and to the back wall to define a storage compartment in the interior of the crate.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2, 11, 14–16 is confirmed.

Claims 1, 3–10, 12 and 13 are cancelled.

* * * * *